United States Patent
Bolt et al.

(10) Patent No.: US 9,166,920 B2
(45) Date of Patent: Oct. 20, 2015

(54) USING ROUTING INFORMATION AND INTER-LAYER RELATIONSHIPS TO DETERMINE UTILIZATION IN A TRANSPORT NETWORK

(71) Applicant: Riverbed Technology, Inc., San Francisco, CA (US)

(72) Inventors: Gordon Bolt, Apex, NC (US); Stein Somers, Ghent (BE); Xiaofeng Liu, Cary, NC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 122 days.

(21) Appl. No.: 13/745,055

(22) Filed: Jan. 18, 2013

(65) Prior Publication Data

US 2013/0188488 A1    Jul. 25, 2013

Related U.S. Application Data

(60) Provisional application No. 61/588,357, filed on Jan. 19, 2012.

(51) Int. Cl.
| | |
|---|---|
| H04J 1/16 | (2006.01) |
| H04L 12/835 | (2013.01) |
| H04L 12/24 | (2006.01) |
| H04L 12/26 | (2006.01) |

(52) U.S. Cl.
CPC ............... H04L 47/30 (2013.01); H04L 41/12 (2013.01); H04L 41/14 (2013.01); H04L 41/22 (2013.01); H04L 43/0817 (2013.01); H04L 43/16 (2013.01)

(58) Field of Classification Search
CPC ......... H04L 12/56; H04L 41/12; H04L 41/14; H04L 41/16; H04L 41/22; H04L 43/08; H04L 43/16; H04L 47/30
USPC ........................... 370/225–260; 709/224, 229
See application file for complete search history.

(56) References Cited

U.S. PATENT DOCUMENTS

7,457,737 B2 * 11/2008 Patiejunas ........................ 703/14
2007/0076628 A1 * 4/2007 Li et al. ........................ 370/254

(Continued)

OTHER PUBLICATIONS

"Series G: Transmission Systems and Media, Digital Systems and Networks, Digital transmission systems—Digital networks—Optical transport networks: Architecture of optical transport networks," ITU-T Recommendation G.872, International Telecommunication Union, Feb. 1999; 37 pages.

(Continued)

Primary Examiner — Kevin C Harper
(74) Attorney, Agent, or Firm — Park, Vaughan, Fleming & Dowler LLP (57) ABSTRACT

Embodiments provide systems, methods, and computer program products for mapping higher-layer circuits, links, flows, and services to lower layer circuit and connection elements to determine utilization of the lower layer circuit elements based on the high-layer traffic. Higher layer configuration data and lower layer configuration data are imported to populate a model. An inter-layer relationship is either directly or indirectly mapped from the higher layers to the lower layer. Once the inter-layer relationship is established, the higher-layer circuits, links, flows, and services are inspected using the lower layer circuit and connection elements. Circuit and packet-based utilization is determined for the lower layer elements based on the higher-layer traffic flows.

16 Claims, 9 Drawing Sheets

(56) References Cited

U.S. PATENT DOCUMENTS

2007/0258381 A1* 11/2007 Lichtenauer et al. ......... 370/252
2007/0297336 A1* 12/2007 Pitcher et al. ................. 370/236
2009/0116384 A1*  5/2009 Kim et al. ..................... 370/230
2011/0051730 A1*  3/2011 Baek et al. .................... 370/392

OTHER PUBLICATIONS

"Series G: Transmission Systems and Media, Digital Systems and Networks, Digital Networks—General Aspects: Generic functional architecture of transport networks," ITU-T Recommendation G.805, International Telecommunication Union, Mar. 2000; 58 pages.

* cited by examiner

USING ROUTING INFORMATION AND INTER-LAYER RELATIONSHIPS TO DETERMINE UTILIZATION IN A TRANSPORT NETWORK

CROSS-REFERENCE TO RELATED APPLICATIONS

The present application claims the benefit of U.S. Provisional Patent Application No. 61/588,357, filed on Jan. 19, 2012, which is incorporated herein by reference in its entirety.

BACKGROUND

1. Technical Field

The present disclosure relates generally to determining utilization in a lower layer based on traffic information from upper layers.

2. Background Art

Content-rich services have been driving the growth of network consumption and bandwidth provisioning. It is a challenge for service providers (e.g., operators of a data network such as a layer-2 and/or layer-3 network) to efficiently manage bandwidth in the core networks they manage. Service providers use modeling tools to predict traffic growth and request network capacity (e.g., from operators of a layer-1 network such as a transport network) to support the service requirements predicted. However, current tools do not provide insight to transport network planners into the amount of actual data traffic carried by a transport network circuit, fiber, or wavelength. Instead, transport network planners have been limited to looking at the circuit or wavelength capacity of transport network elements, with no visibility into packet traffic utilizing the capacity.

Accordingly, there is a need for methods, systems, and computer program products to map higher-layer circuits, connections, links, flows, and services to transport network elements to determine utilization of transport network elements based on carried packet-based traffic and circuit-based subscription.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For the purpose of this disclosure, the term "node" is used to refer to any network element, including routers, switches, bridges, terminals, hosts, etc. The term "switch" is used to refer to nodes that can be configured to receive packets or frames on one port (or interface) and selectively forward the packets or frames onto another port. As such, the term "switch" encompasses such elements as Layer-3 (L-3) routers or switches, Layer-2 (L-2) switches, bridges, etc. The term "transport network" is used to refer to Layer-1 (L-1)/physical layer networks, such as for example Synchronous Optical Networking (SONET)/Synchronous Digital Hierarchy (SDH), Ethernet, Optical Transport Network (OTN), Wavelength Division Multiplexing (WDM), and Digital Subscriber Line (DSL). These are by way of example only; other L-1 networks are also within the scope of the present application, as would be understood by a person skilled in the relevant art(s).

Figure 1:
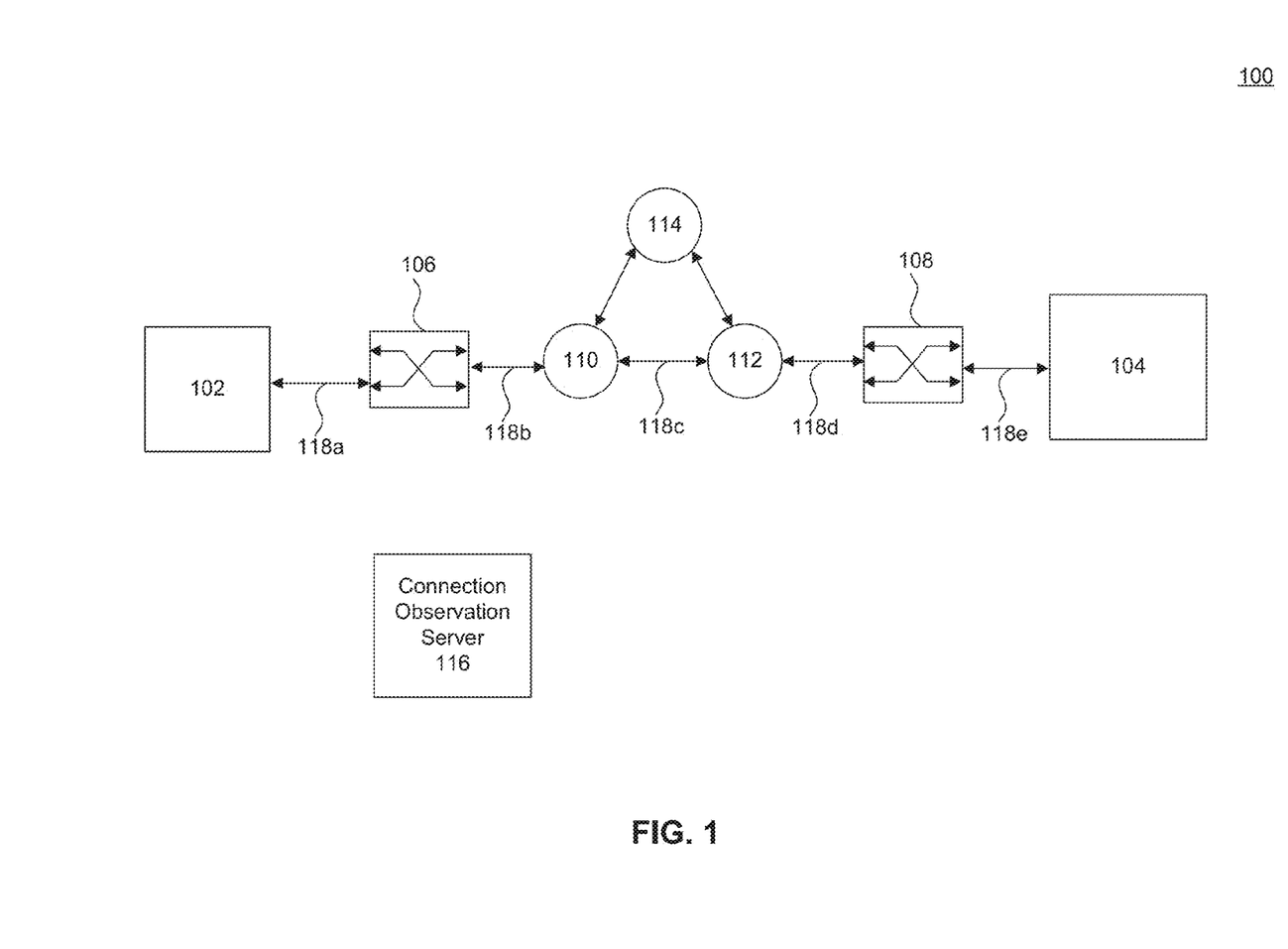
FIG. 1 illustrates an exemplary network environment according to an embodiment.

FIG. 1 illustrates an example network environment 100 according to an embodiment of the present disclosure. Example network environment 100 is provided for the purpose of illustration and is not limiting of embodiments of the present disclosure. As shown in FIG. 1, example network environment 100 includes a plurality of network nodes 102, 104, 106, 108, 110, 112, and 114 and a network observation server 116. As would be understood by a person skilled in the relevant art(s) based on the teachings herein, example network environment 100 may include more or fewer network nodes and/or elements than shown in FIG. 1.

In an embodiment, network nodes 102 and 104 are host devices which are in communication with each other. For example, network nodes 102 and 104 may be in communication to support a network application. The network application may be any type of application including, for example, a client-server application or a peer-to-peer application. Communication between nodes 102 and 104 may be enabled by one or more intermediate nodes. For example, communication between nodes 102 and 104 may be enabled by nodes 106, 108, 110, and 112, which along with nodes 102 and 104 establish a communication path between nodes 102 and 104. In an embodiment, the communication path includes a plurality of links 118*a-e* as shown in FIG. 1. Each link 118*a-e* may include one or more data links and may include further network nodes. The links 118*a-e* may be, for example, coaxial and/or fiber optic, to name just a few examples.

The intermediate nodes between nodes 102 and 104 may include L-3 and/or L-2 devices. In the example of FIG. 1, nodes 110, 112, and 114 are L-3 devices, and nodes 106 and 108 are L-2 devices. L-3, or network layer, devices include devices such as routers and L-3 switches. L-3 devices perform packet routing based on maintained routing tables. Typically, a routing table at an L-3 device enables the device to map a packet's L-3 destination address to an outgoing interface on the device. In addition, L-3 devices may perform L-2 switching, as further described below. L-3 devices may further employ an L-3 to L-2 resolution protocol (e.g., Address Resolution Protocol (ARP)) to translate L-3 (e.g., IP) addresses to L-2 (e.g., Medium Access Protocol (MAC)) addresses, and may maintain ARP tables.

L-2, or data link layer, devices include devices such as L-2 switches and bridges. L-2 devices implement frame switching, whereby a data frame received by an ingress interface (incoming data port) is switched for transmission by an egress interface (outgoing data port) based on an L-2 forwarding table. For example, L-2 switching may rely on a MAC forwarding table (MAFT), which maps frame destination MAC addresses to outgoing data port numbers of the L-2 device. Typically, each ingress/egress interface has an associated MAC address. L-2 devices typically construct their respective L-2 forwarding tables based on source L-2 addresses contained in received frames (data or control frames).

L-1, or physical layer, devices include devices such as SONET/SDH circuits, OTN circuits, optical fibers, etc. L-1 devices are designed to transmit the actual physical signals that comprise a bit stream of data. Typically, the physical layer is where the types of connectors, broadcast frequencies, broadcast wavelengths, and modulation schemes, among other low-level parameters, are defined to facilitate hardware-specific operations.

For example, one or more of the links 118a-e that connect L-1 devices at the various nodes may be coaxial cables or optical fibers. In one embodiment, the links 118a-e may be SONET/SDH links that utilize optical fibers. In this embodiment, the physical signals may be time-division multiplexed on each SONET/SDH link (e.g., time-division multiplexing bytes of frames in Synchronous Transport Signal (STS)-1 or Optical Carrier (OC)-1 signals to form STS-3/OC-3 signals, with further aggregating of slower signals from slower circuits to form higher-speed signals/circuits) and transmitted across the links 118a-e. Each SONET/SDH link 118a-e may utilize WDM to enable multiple wavelengths having different carrier signals to utilize the same optical fiber. Multiple optical fibers may be utilized, the fibers being carried by one or more physical cables or conduits that may carry many optical fibers.

Network observation server 116 may be a server maintained by the operators of the network. As will be further discussed below, network observation server 116 may map devices, links, and/or connections between layers based on operational data (e.g., device configurations, data/control traffic, routing tables, L3-to-L2 translation tables, L-2 forwarding tables, etc.) collected from respective layers of the network, such as from the L-3, L-2, and L-1 devices operating on their respective layers as discussed above.

Embodiments of the present disclosure, as further described below, provide systems and methods for mapping the relationship(s) between devices, links, and connections of the different layers, so that the utilization of the L-1 network elements may be inspected based on carried packet-based traffic. An example of logical links 200 subject to, and used in, such analysis is provided in FIG. 2. Logical links 200 may be, for example, based on the Open Systems Interconnection (OSI) reference model as is understood by a person skilled in the relevant art(s). Example logical links 200 are provided for the purpose of illustration only and are not limiting. As would be understood by a person skilled in the relevant art(s) based on the teachings herein, example logical links 200 may be implemented in a different manner and using different logical layers than those shown in FIG. 2. Accordingly, embodiments are not limited by the structure shown in FIG. 2.

Figure 2:
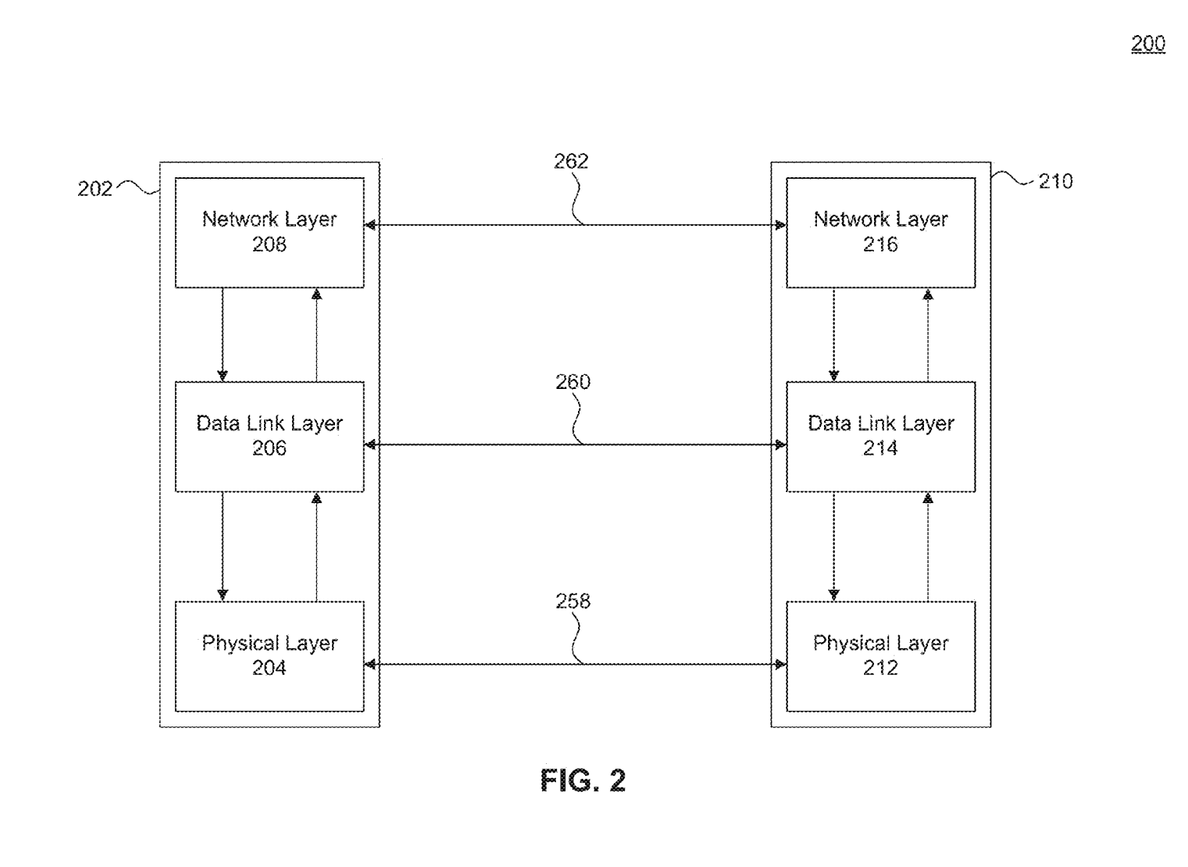
FIG. 2 illustrates exemplary logical links between layers according to an embodiment.

In FIG. 2, only a few of the lower layers of a typical OSI reference model are depicted, because they are the layers that most typically are of interest to the modeling and planning features according to embodiments of the present disclosure. A first protocol stack 202 may be in communication with a second protocol stack 210, each of which may be housed fully within a single device, or alternatively each layer of the stack may be housed in a separate device specifically designed for that layer, as will be recognized by a person skilled in the relevant art(s).

In operation, each protocol stack may operate by encapsulation. When transmitting a message from the first protocol stack 202 to the second protocol stack 210, each layer n receives a data packet from the layer above it (n+1), to which the layer n adds additional information pertinent to the operations of that layer n. For example, the network layer 208 may receive a data packet from an upper layer (not shown in FIG. 2), such as a transport layer (as described in the OSI reference model). The network layer 208 encapsulates the data packet in a network layer envelope. The network layer envelope may add packet routing information (e.g., in a header and/or trailer) based on routing tables maintained by the network layer 208 device so that the data packet may find a path through a series of connected nodes. The network layer envelope is forwarded down to the next lower layer, such as the data link layer 206.

The data link layer 206 may receive the network layer envelope and again may encapsulate the received data in an additional envelope, described here as a data link layer envelope. This envelope may include identifying information so that the beginning and ending of bit streams may be found, as well as adding a checksum for error detection and correction. The data link layer 206 forwards the data link layer envelope to the physical layer 204, which handles the transmission of bits of information across a physical connection. The data link layer 206 utilizes the physical layer 204 to control delivery of the data link layer envelope to the destination, in this example the second protocol stack 210. According to an embodiment, the physical layer 204 (represented by a respective physical layer device) may be, for example, part of the transport network discussed above with respect to FIG. 1.

As the data link layer envelope reaches each node on its route, or the final destination, each layer de-encapsulates each envelope as necessary to determine the destination network and routing/switching necessary to find a path to the final destination. For example, at the second protocol stack 210, the physical layer 212 may receive a signal 258 from the physical layer 204, convert the received signal into a bit stream, and forward the bit stream to data link layer 214. The data link layer 214 may process the received bit stream by removing the data link layer envelope. By analyzing the information that was added in the data link layer envelope by the data link layer 206, the data link layer 214 receives the data added by the data link layer 206 and in effect establishes a data link layer logical link 260 with the data link layer 206.

Now stripped of the data link layer envelope, the data link layer 214 forwards the remaining network layer envelope up to network layer 216. The network layer 216 similarly de-encapsulates the data packet contained in the network layer envelope to analyze the information that the network layer 208 had included in the network layer envelope in addition to the original data packet. By analyzing the information added in the network layer envelope by the network layer 208, the network layer 216 establishes a logical link 262 with the network layer 208.

As will be recognized by those skilled in the relevant art(s), additional layers may exist, including an application layer where the data is presented to a user. As will be additionally recognized, there are many layers that do not fit exactly within the OSI reference model that may alternatively or additionally be used with the layers discussed above in communicating a data packet between devices. For example, one such protocol is Multiprotocol Label Switching, which operates somewhere between the L-2 and L-3 layers of the OSI reference model, sometimes referred to as a "layer 2.5 protocol." This is by way of example only, and many other protocols useful for high performance telecommunications networks, such as fiber optic networks, may be used for communication between devices according to embodiments of the present disclosure, as will be recognized by those of skill in the art.

Figure 3:
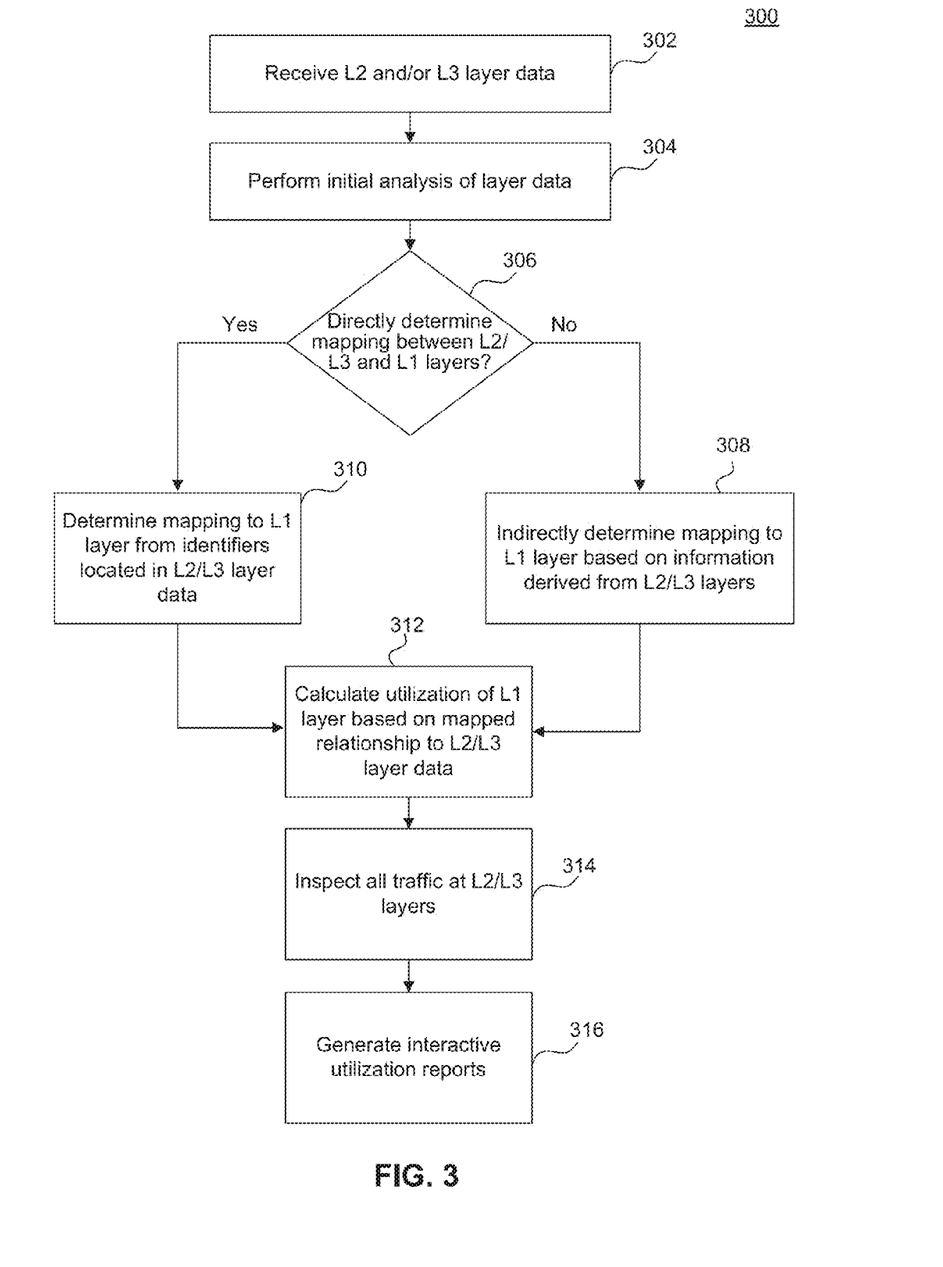
FIG. 3 is an exemplary flowchart of a process for mapping upper layers to a lower layer according to an embodiment.

FIG. 3 is an exemplary flowchart of a process 300 for mapping upper layers to a lower layer, such as a physical layer (as well as traffic inspection and utilization analysis) according to an embodiment. Although the exemplary process 300 may be performed on any number of computing devices, the present discussion will be made with respect to an exemplary server, such as network observation server 116 discussed with respect to FIG. 1.

At step 302, the server receives L-2 and/or L-3 layer data, such as traffic flow data to name just one example, using the network. This may be done, for example, by automatically or manually importing the layer data and configuration data from files maintained by the operator(s) of the different L-2 and/or L-3 devices in operation. As will be appreciated by those skilled in the relevant art(s), the traffic using the network may be specified at any layer in terms of the technologies or services supported at a given layer. For example, packet-based traffic may be specified as flows between Internet Protocol (IP) addresses, Virtual Local Area Network (VLAN) interfaces, L-2 or L-3 Virtual Private Network (VPN) services, and multicast groups, to name a few examples.

In transport networks, routing is generally configured statically and is managed through a central network management system. This data is imported separately from the L-2 and L-3 layer data.

At step 304, an initial analysis of the data received at step 302 may be performed after the received data is extracted. For example, a routing analysis may be used to determine the use of resources by traffic within a layer. The details of the routing analysis are based on the applicable technologies within the layer. For example, the IP routing (L-3) is determined by modeling the behavior and interactions of configured routing protocols, such as Border Gateway Protocol (BGP), Open Shortest Path First (OSPF), or Intermediate System to Intermediate System (IS-IS) by way of example. L-2 routing is determined by modeling the behavior of Ethernet networks, including Spanning Tree Protocol (STP) and VLANs. The routing analysis may be performed for the network under both baseline and failure conditions, depending on the specific needs of the system.

The ensuing steps of the present process 300 are used for mapping the L-2 and L-3 layer data and routing analysis results to the data collected separately for the transport network(s).

At step 306, it is determined whether the upper layer link may be directly mapped to the lower layer connection, for example to a physical layer connection. The upper layer may be directly mapped to the lower layer when there is an explicit supporting relationship between a connection on the lower layer and a link on a higher layer, for example as described in ITU Recommendation G.872 and ITU Recommendation G.805 which are incorporated by reference herein in their entirety.

When a direct mapping is not possible, the process 300 proceeds at step 308, which includes indirectly determining a mapping to the physical layer based on information derived from the L-2 and/or L-3 layers. The information used may include device name, device description, and/or location of the L-2 and/or L-3 device/link. The physical layer information may include device name, site name, and point of presence location, by way of example only. The indirect mapping involves creating a mapping relationship between L-2 and/or L-3 devices and transport network devices, as well as between L-2 and/or L-3 links and transport network connections. One L-2 and/or L-3 device may be mapped to one transport network device, multiple L-2 and/or L-3 devices may be mapped to the same transport network device, or one L-2 and/or L-3 device may be mapped to multiple transport network devices. This last alternative may be appropriate where the L-2 and/or L-3 device is dual-homed to multiple transport elements or transport sites, any of which may be a candidate to source/sink supporting connections.

Similarly, a L-2 and/or L-3 link may map to zero (a "native" L-2 and/or L-3 link without a supporting connection in the transport network), one transport network connection (one-to-one), or many transport network connections (one-to-many). The one-to-many mapping represents a L-2 and/or L-3 link that is supported by multiple underlying transport connections (e.g., an approximately 10 Gbps Ethernet L-2 link supported by up to 4×STS-48 SONET connections, each of approximately 2.5 Gbps payload). There are multiple ways in which to perform the indirect mapping. For example, a mapping of both devices and links may be automatically performed, manually performed, or imported from file.

In one embodiment, the indirect mapping of both the devices and links may be performed automatically. The indirect mapping may be performed automatically when information from the L-2 and/or L-3 devices may include a description that enables an inference of the transport network circuit that is carrying that L-2 and/or L-3 device's traffic, as well as which connection(s) supports any L-2 and/or L-3 link. In one example, a router configuration file may be imported at step 302 above which may include a description that enables the server to infer the multi-layer relationship and complete the mapping.

Figure 6A:
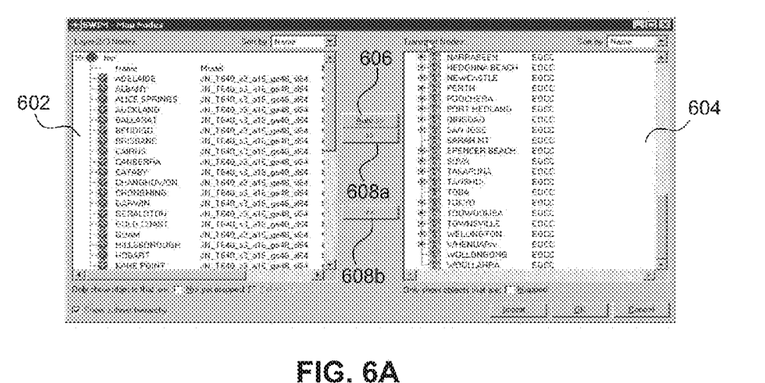
FIG. 6A illustrates an exemplary process that may be used to indirectly map a relationship between nodes of different layers according to an embodiment.

FIG. 6A is an exemplary dialog box that may be used for automatically, or manually, determining a relationship between L-2 and/or L-3 devices and transport network elements and sites (e.g., mapping L-2 and/or L-3 nodes to transport network nodes). In FIG. 6A, the L-2 and/or L-3 devices that are available for mapping may be listed in field 602, while the transport network elements and sites available for mapping may be listed in field 604. By selecting button 606, the server may be instructed to automatically map as many as possible of the L-2 and/or L-3 devices to the transport network elements and sites from inferences available from existing data. Alternatively, mapping may be performed manually by selecting one or more L-2 and/or L-3 devices in field 602 and transport network elements and sites in field 604, and selecting buttons 608a and/or 608b. Selecting buttons 608a and/or 608b causes the server to map the selected L-2 and/or L-3 devices to the transport network elements and sites (or the selected transport network elements and sites to the selected L-2 and/or L-3 devices). The resulting mappings may be saved to a file, such as an XML file, for later importation and use.

Figure 6B:
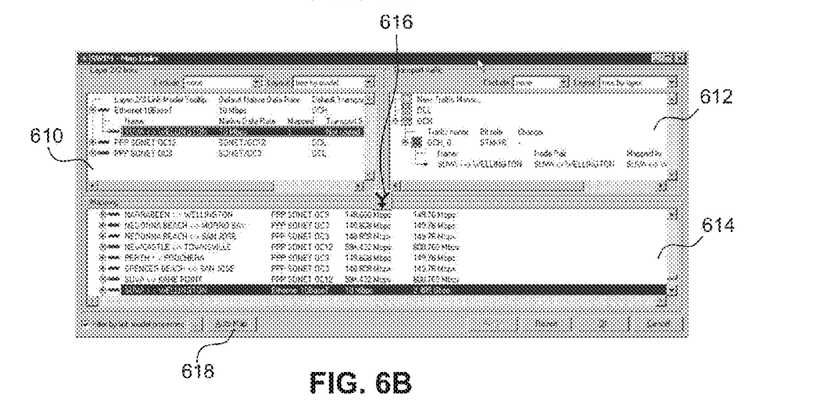
FIG. 6B illustrates an exemplary process that may be used to indirectly map a relationship between links and connections of different layers according to an embodiment.

In an alternative embodiment, the indirect mapping of links to connections may be performed automatically, or manually, via a GUI dialog box, as for example shown in FIG. 6B. A user of the system may select a L-2 and/or L-3 link from those listed in field 610, and then select a transport network connection from field 612. To complete manual mapping, the user may then select button 616, which completes the manual mapping and lists the result in field 614. Both L-2 and/or L-3 links may be mapped to corresponding transport network connections in this manner. Alternatively, mapping may be performed automatically by selecting button 618, which instructs the server to automatically map as many L-2 and/or L-3 links to corresponding transport network connections as possible. The resulting mappings may be saved to a file, such as an XML file, for later importation and use.

Figure 6C:
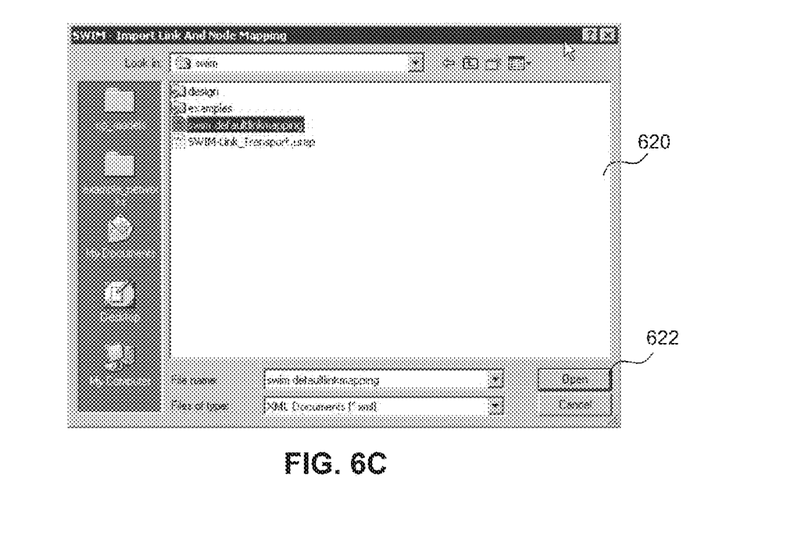
FIG. 6C illustrates an exemplary file importing process that may be used to indirectly map a relationship between layers according to an embodiment.

In an alternative embodiment, the indirect mapping of the devices and links, or either alone, may have been performed previously, for example by an automatic or manual process as discussed above, and saved to file. The mapping relationship may now be imported from file, such as from an XML file, in order to establish the relationship between L-2 and/or L-3 devices/links and transport network circuits/connections. A dialog box that may be used for such importation is shown, for example, in FIG. 6C, where a user may select a file that contains mapping information from the field 620 and select button 622 to open the file and complete the mapping.

Returning to process 300, when a direct mapping is possible, the process 300 proceeds instead to step 310 to directly determine a mapping to the physical layer based on information contained in the L-2 and/or L-3 data. The data may be, for example, configuration data. Direct determination is possible when the relationship between the L-2 and/or L-3 device/link and the physical layer is part of the device, link, or connection definition itself.

Figure 5A:
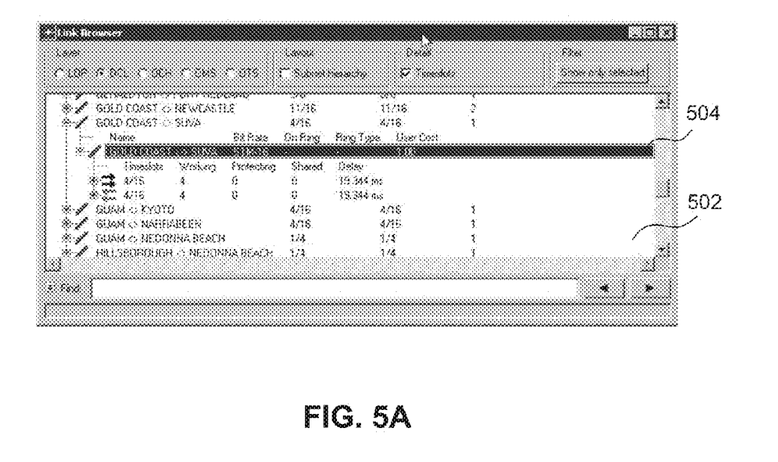
FIGS. 5A and 5B illustrate an exemplary supporting relationship that may be used to directly map a relationship between layers according to an embodiment.
Figure 5B:
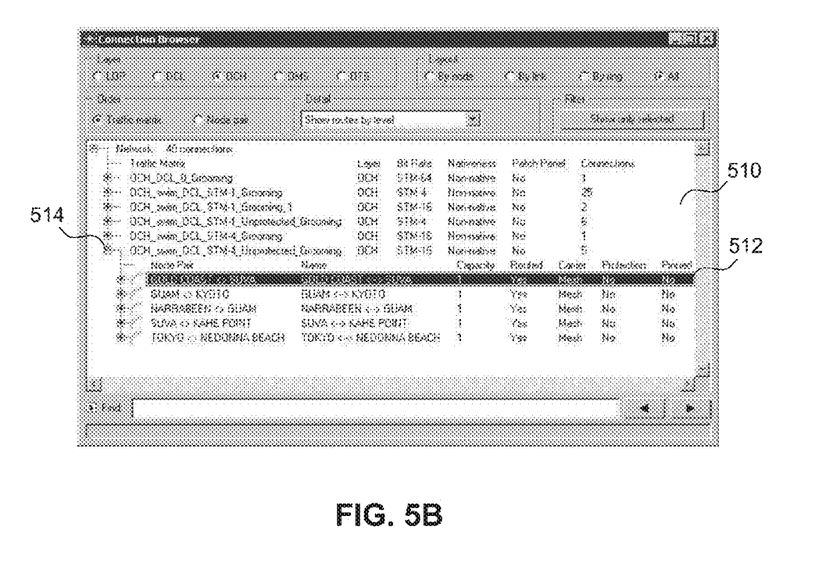

FIGS. 5A and 5B illustrate an exemplary direct relationship. In FIG. 5B, a connection browser shows the transport network connections available in field 510, such as the STM-16 connection matrix 514 that has connections providing 16 timeslots for high layer SONET/SDH traffic. By double-clicking on the selected connection 512, a link browser such as in FIG. 5A opens with the supported SONET/SDH link 504 that is directly mapped to the underlying connection listed in field 510. In one example, the underlying connection may be an optical channel and the higher-layer link may be a SONET/SDH link. This is exemplary only; many other types of connections and links are possible, as will be recognized by a person skilled in the relevant art(s).

Upon completion of the mapping of the inter-layer relationship by either the direct (step 310) or indirect (step 308) approach, calculations and analyses are then possible. The process 300 may proceed to calculate the utilization of the physical layer based on traffic units of a higher layer at step 312. For example, the L-2 and/or L-3 packet-based traffic load carried by a lower layer link may be determined by allocating the traffic load to the supporting transport network connection(s). In situations where one higher layer device and/or link is supported by more than one transport network circuit and/or connection, the traffic may be allocated depending on either specific technologies or approaches appropriate for the modeling purpose. Regardless of the allocation approach used, the traffic load on each link is calculated by summing up the loads of all of the link's supported connections.

For example, a "first fit" approach may be adopted to simplify viewing the amount of spare capacity in the overall network. Thus, if there are multiple supporting transport network connections for a given L-2 and/or L-3 link, the traffic load will be assigned to the first connection from the list of connections available up to the first connection's capacity. If some traffic remains unassigned, the second connection from the list is chosen, and so on until the traffic load has been completely allocated or until all supporting connections are assigned. The "first fit" approach may make it easier to visualize how many circuits are required at a lower layer, for example the physical layer, to carry the existing traffic.

As another example, a "round-robin" distribution algorithm may be adopted to allocate the traffic load. The "round-robin" distribution algorithm splits equally the traffic load across all supporting transport network connections, which assigns equal traffic to each connection in the supporting connection bundle. As will be recognized by those skilled in the relevant art(s), other allocation approaches are possible without departing from the scope of the present disclosure.

Once allocation is complete, utilization may then be computed. As will be apparent to those skilled in the art, utilization may be computed based on the defined payload bandwidth for each link, node, or connection, and the traffic carried. With utilization calculated for circuit and/or packet-based utilization, it is possible to express the utilization of a connection, link, or node based on traffic units of a higher layer. The utilization may further be expressed graphically based on utilization thresholds and ranges, for example as shown in FIG. 7, which illustrates a GUI 700 that may be used to explore link utilization according to an embodiment.

Figure 7:
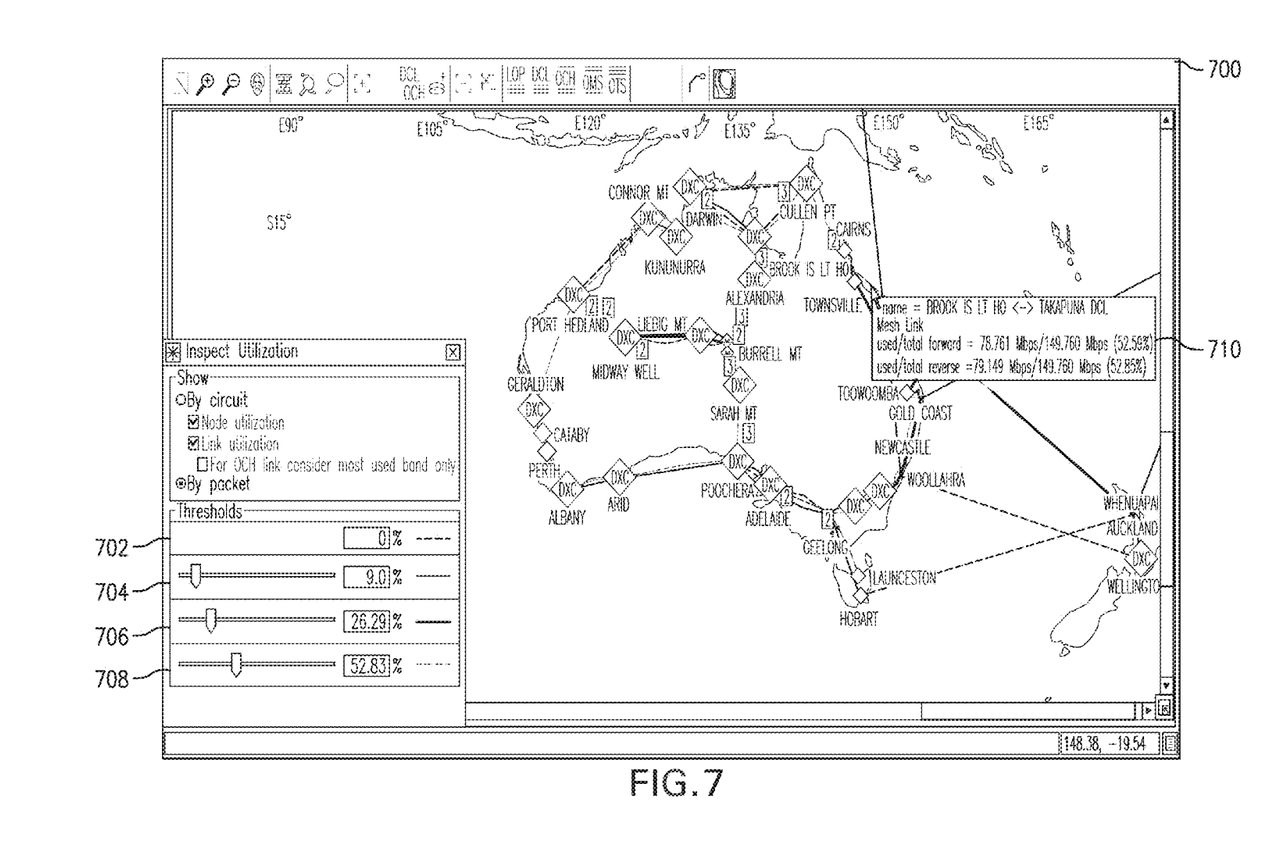
FIG. 7 illustrates an exemplary graphical user interface (GUI) that may be used to explore link utilization according to an embodiment.

In the example embodiment of FIG. 7, the links are displayed based on their level of utilization. Utilization may be depicted in ranges whose thresholds may be set and modified as needed. In FIG. 7, for example, the links with utilization falling within a first threshold, for example ranging from 0% to 9.0%, are marked in a first manner 702. The links with utilization falling within a second threshold, for example ranging from 9.0% to 26.29%, are marked in a second manner 704. The links with utilization falling within a third threshold, for example ranging from 26.29% to 52.83%, are marked in a third manner 706. The links with utilization falling within a fourth threshold, for example ranging from 52.83% to 100.0%, are marked in a fourth manner 708. These ranges and thresholds are exemplary only. Further, the number of levels that may be used to depict utilization may be more or fewer than four, as will be recognized by one of skill in the art. To ascertain the exact utilization values for a specific link, in one embodiment, a user may place their cursor over that link and a tooltip box 710 may appear that includes the name of the link and the forward and reverse utilization.

Figure 8:
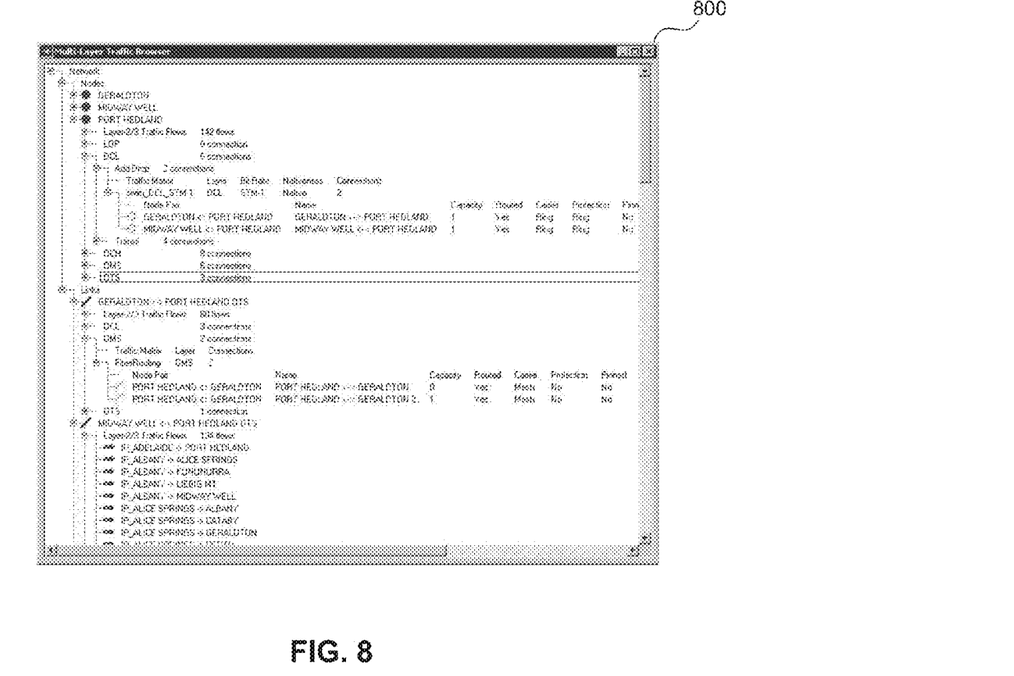
FIG. 8 illustrates an exemplary dialog box for inspecting all traffic supported by a selected link or node at a given network layer according to an embodiment.

Returning to the process 300 of FIG. 3, once the utilization has been calculated at step 312, a user may inspect all the traffic supported by the links or nodes at a given layer at step 314. For example, a user of the GUI of FIG. 7 may click on a link, connection, or node of interest and a dialog box, such as the dialog box 800 of FIG. 8, may appear. The dialog box 800 may be a traffic report that includes node, link, and/or connection utilization for a selected node, link, or connection. For example, the dialog box 800 shows all of the traffic over an exemplary link, here the OTS link "GERALDTON ←→ PORT HEDLAND" categorized by traffic layer. In this example, the OTS link carries one OTS connection, two OMS connections, three DCL connections, and 60 IP traffic flows.

Figure 9:
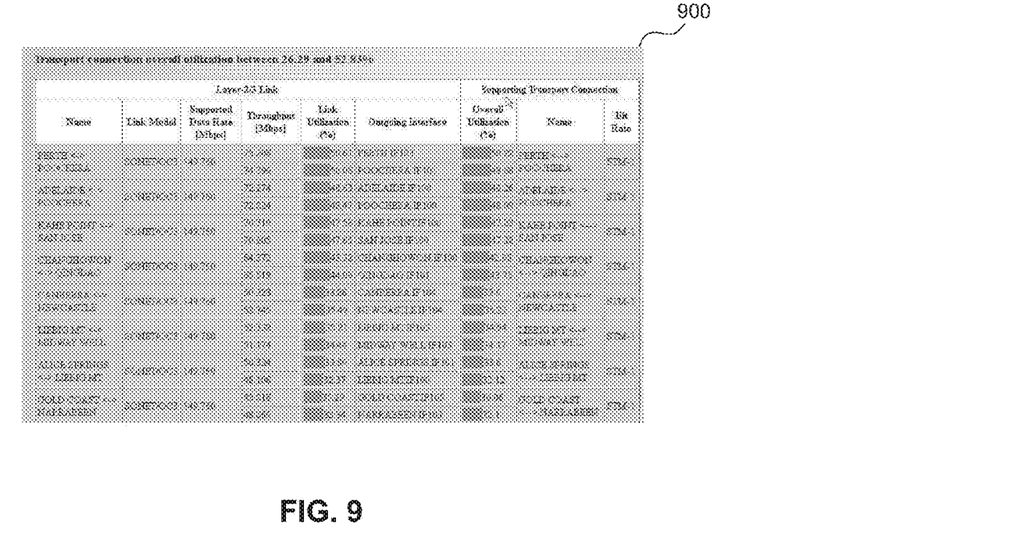
FIG. 9 illustrates an exemplary utilization report sorted according to utilization level, according to an embodiment.

At step 316, the server may additionally generate interactive utilization reports. Such a utilization report may show node, link, and connection utilization and may be sorted by node, link, or connection utilization. The utilization report may additionally include other information, for example mapped L-2 and/or L-3 links or devices. An exemplary report 900 is illustrated in FIG. 9, which shows utilization broken down by the L-2 and/or L-3 link, the supporting transport network connection, the supported data rate, the throughput, the utilization rate, and the interface. The utilization may be further illustrated in both directions for each transport network circuit.

Figure 4:
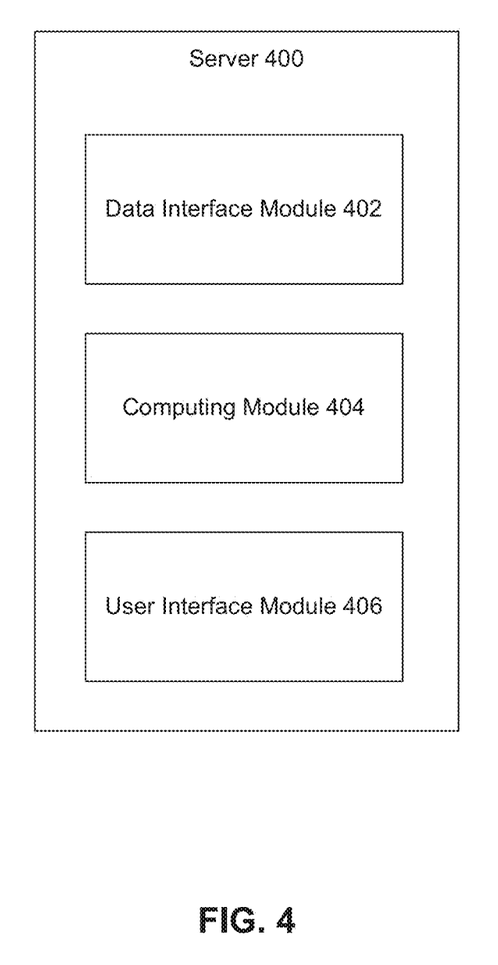
FIG. 4 illustrates an exemplary server apparatus according to an embodiment.

An exemplary server 400 configured to perform the steps of FIG. 3 is illustrated in FIG. 4. Server 400 may be, for example, an embodiment of network observation server 116 disclosed in FIG. 1 and may be maintained by the operators of the transport network being analyzed. Server 400 may include a data interface module 402, a computing module 404, and a user interface module 406. These modules are exemplary only, and for the sake of simplicity of discussion only these modules are depicted and discussed. A person skilled in the relevant art(s) will recognize that other modules may exist within server 400 for operation. Server 400 may receive operational data from the physical layer, the L-2, and/or L-3 layers via the data interface module 402. The data interface module 402 may include one or more of a USB port, an Ethernet port, a Wi-Fi port, or any other means of interfacing with another source of data as will be recognized by a person skilled in the relevant art(s).

The computing module 404 may be configured to perform the mapping of devices and/or connections between layers to establish the inter-layer relationships based on the operational data received. The computing module 404 may be further configured to calculate the utilization of each device, link, or connection at each layer as required. The computing module 404 may include, for example, one or more processors as will be discussed in more detail below with respect to FIG. 10.

The user interface module 406 may be configured to perform inspection of the traffic of the L-2 and/or L-3 layers supported by the physical layer. This may be performed, for example, by a user with a mouse and a GUI displayed on a computer screen. A user may also use the user interface module 406 to assist in performing the mapping between layers, as was discussed above with respect to step 308 of FIG. 3.

Alternatively or in addition, inspection of the traffic may be performed automatically by a computing resource, such as the server 400 (e.g. using computing module 404), or some other computing device connected to or in communication with the server 400. The computing resource may compute circuit and packet-based utilization as well as produce reports without requiring user interaction via GUI or other types of interaction.

Using the server 400 as configured, higher-layer circuits, such as L-2 and L-3 circuits, and higher-layer links and flows may be inspected using transport network circuits and connections, and circuit utilization and packet-based utilization may be determined for the transport network elements based on the traffic flows of the higher-layer elements. This enables transport network planning based on an awareness of actual packet traffic using the transport network circuits and connections.

Figure 10:
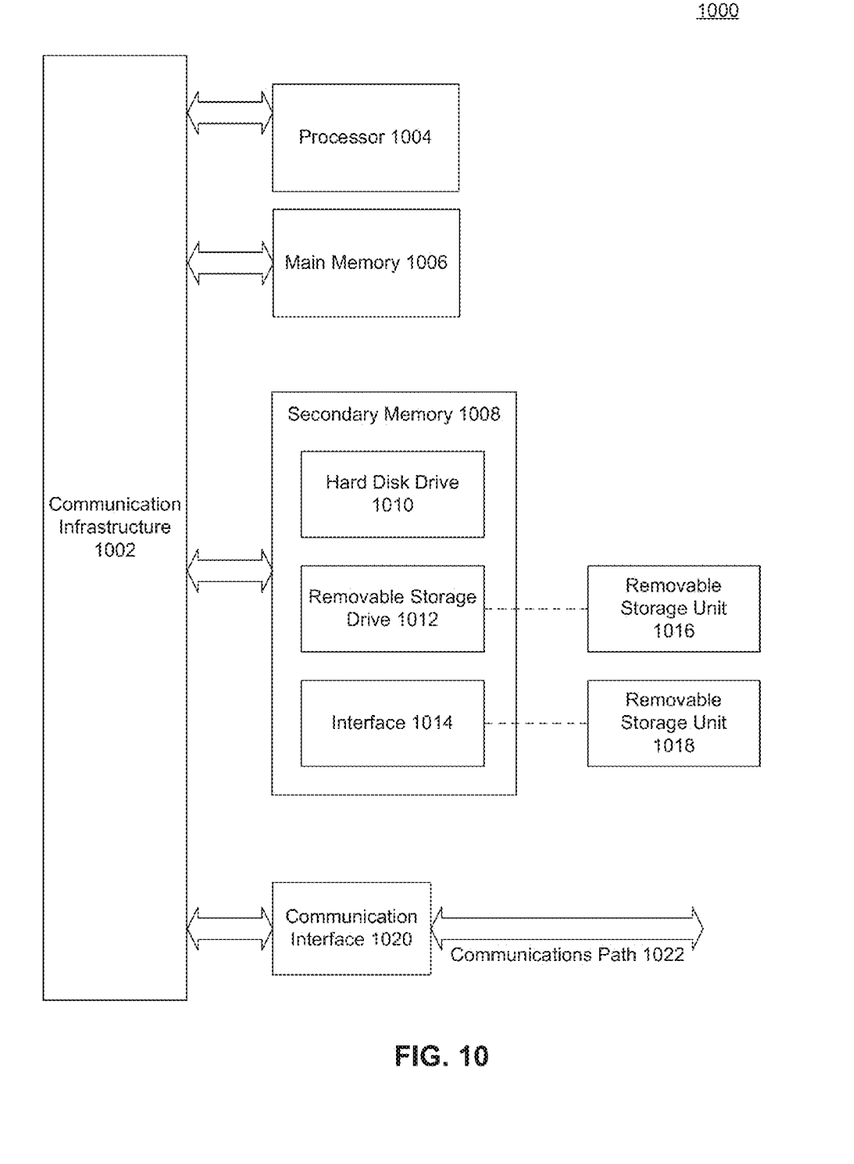
FIG. 10 illustrates an exemplary computer system that can be used to implement aspects of embodiments.

Embodiments of the present disclosure can be implemented in hardware, software or as a combination of software and hardware. Consequently, embodiments of the disclosure may be implemented in the environment of a computer system or other processing system. An example of such a computer system 1000 is shown in FIG. 10. Embodiments described in FIGS. 1, 2, and 4 may execute on one or more computer systems 1000. Furthermore, each of the steps of the processes depicted in FIG. 3 can be implemented on one or more computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCM-CIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for generating a multi-layer model in a network using a server, comprising:
    determining traffic information at a lower layer and an upper layer of the network, the lower layer being configured to support at least the upper layer;
    mapping the upper layer to the lower layer, wherein the mapping comprises at least one of mapping an upper layer device to one or more lower layer devices and mapping an upper layer link to one or more lower layer connections, wherein the mapping comprises automatically matching upper layer information with lower layer information to indirectly determine a relationship between the upper layer and the lower layer, wherein the upper layer information comprises one or more of device name, description, and location, and wherein the lower layer information comprises one or more of device name, site name, and point of presence location; and
    calculating utilization of a lower layer device or a lower layer connection based on the traffic information of the upper layer.

2. The method of claim 1, further comprising:
    displaying the utilization in an interactive graphical user interface (GUI), the utilization being depicted within a plurality of thresholds; and
    generating a traffic report including node, link, and connection utilization of the lower layer based on a selection of a node, a link, or a connection from the GUI.

3. The method of claim 1, wherein the mapping comprises:
    directly determining a relationship between the upper layer and the lower layer based on a supporting relationship between the lower layer connection and the upper layer link.

4. The method of claim 1, wherein the mapping comprises:
    manually matching upper layer information with lower layer information utilizing a graphical user interface dialog box to indirectly determine a relationship between the upper layer and the lower layer.

5. The method of claim 1, wherein the mapping comprises:
    importing data that defines a relationship between the upper layer and the lower layer from a file.

6. The method of claim 1, wherein the lower layer comprises a Layer-1 layer, and the upper layer comprises one or more of a Layer-2 layer and a Layer-3 layer.

7. The method of claim 1, wherein a link on the upper layer is supported by a plurality of connections on the lower layer, and wherein the calculating further comprises:
    allocating the traffic information to the plurality of connections utilizing a "first fit" approach, wherein the traffic information is first assigned to a first connection from the plurality of connections up to the first connection's capacity.

8. A system for generating a multi-layer model in a network, comprising:
    a data interface module configured to receive traffic information for a lower layer and an upper layer of the network, the lower layer being configured to support at least the upper layer;
    a computing module configured to map the upper layer to the lower layer, wherein the mapping comprises at least one of mapping an upper layer device to one or more lower layer devices and mapping an upper layer link to one or more lower layer connections, wherein the mapping comprises automatically matching upper layer information with lower layer information to indirectly determine a relationship between the upper layer and the lower layer, wherein the upper layer information comprises one or more of device name, description, and location, and wherein the lower layer information comprises one or more of device name, site name, and point of presence location;
    a computing module configured to calculate utilization of a lower layer device or a lower layer connection based on the traffic information of the upper layer; and
    a user interface module configured to inspect the utilization and the traffic information of the upper layer supported by the lower layer.

9. The system of claim 8, wherein the user interface module is further configured to:
    display the utilization in an interactive graphical user interface (GUI), wherein the utilization is broken down into a plurality of thresholds; and
    generate a traffic report that includes node, link, and connection utilization of the lower layer based on a selection from the GUI.

10. The system of claim 8, wherein the computing module is further configured to:
    directly determine a relationship between the upper layer and the lower layer based on a supporting relationship between the lower layer connection and the upper layer link.

11. The system of claim 8, wherein the computing module is further configured to:
    manually match upper layer information with lower layer information utilizing a graphical user interface dialog box to indirectly determine a relationship between the upper layer and the lower layer.

12. The system of claim 8, wherein the computing module is further configured to:
import data that defines a relationship between the upper layer and the lower layer from a file.

13. The system of claim 8, wherein the lower layer comprises a Layer-1 layer, and the upper layer comprises one or more of a Layer-2 layer and a Layer-3 layer.

14. A non-transitory computer-readable storage medium having control logic recorded thereon that, when executed by a processor, causes the processor to perform a method for generating a multi-layer model in a network, the method comprising:
determining traffic information at a lower layer and an upper layer of the network, the lower layer being configured to support at least the upper layer;
mapping the upper layer to the lower layer, wherein the mapping comprises at least one of mapping an upper layer device to one or more lower layer devices and mapping an upper layer link to one or more lower layer connections, wherein the mapping comprises automatically matching upper layer information with lower layer information to indirectly determine a relationship between the upper layer and the lower layer, wherein the upper layer information comprises one or more of device name, description, and location, and wherein the lower layer information comprises one or more of device name, site name, and point of presence location;
calculating utilization of a lower layer device or a lower layer connection based on the traffic information of the upper layer;
inspecting the utilization and the traffic information of the upper layer; and
generating a utilization report including node, link, and connection utilization of the lower layer based on a selected location.

15. The non-transitory computer-readable medium of claim 14, wherein the mapping comprises:
manually matching upper layer information with lower layer information utilizing a graphical user interface dialog box to indirectly determine a relationship between the upper layer and the lower layer.

16. The non-transitory computer-readable medium of claim 14, wherein a link on the upper layer is supported by a plurality of connections on the lower layer, and wherein the calculating further comprises:
allocating the traffic information to the plurality of connections utilizing a "first fit" approach, wherein the traffic information is first assigned to a first connection from the plurality of connections up to the first connection's capacity.

* * * * *